United States Patent
Soberano et al.

(10) Patent No.: US 11,994,235 B2
(45) Date of Patent: May 28, 2024

(54) ANGLE STOP ASSEMBLY

(71) Applicant: AS America, Inc., Piscataway, NJ (US)

(72) Inventors: Eric B. Soberano, Barnegat, NJ (US); Niloy Talukder, San Jose, CA (US); Steven D. Kappus, Manville, NJ (US); Verne Myers, Fort Wayne, IN (US); Nitin S. Kolekar, Piscataway, NJ (US); Behnam Heydari, Ridgewood, NJ (US); Mahendra Gunawardena, Hillsborough, NJ (US); Benjamin Smith, Milwaukee, WI (US); Douglas Leavitt, Bethlehem, PA (US)

(73) Assignee: AS America, Inc., Piscataway, NJ (US)

( * ) Notice: Subject to any disclaimer, the term of this patent is extended or adjusted under 35 U.S.C. 154(b) by 624 days.

(21) Appl. No.: 17/268,269

(22) PCT Filed: Aug. 15, 2019

(86) PCT No.: PCT/US2019/046593
§ 371 (c)(1),
(2) Date: Feb. 12, 2021

(87) PCT Pub. No.: WO2020/037093
PCT Pub. Date: Feb. 20, 2020

(65) Prior Publication Data
US 2021/0310578 A1    Oct. 7, 2021

Related U.S. Application Data

(60) Provisional application No. 62/764,770, filed on Aug. 16, 2018.

(51) Int. Cl.
*F16K 31/50*    (2006.01)
*F16K 1/02*    (2006.01)
*F16K 31/04*    (2006.01)

(52) U.S. Cl.
CPC .............. *F16K 31/508* (2013.01); *F16K 1/02* (2013.01); *F16K 31/046* (2013.01)

(58) Field of Classification Search
CPC ......... F16K 31/508; F16K 31/046; F16K 1/02
(Continued)

(56) References Cited

U.S. PATENT DOCUMENTS

| | | | |
|---|---|---|---|
| 4,346,728 A * | 8/1982 | Sulzer | F16K 31/04 74/25 |
| 4,932,434 A | 6/1990 | Taylor | |

(Continued)

FOREIGN PATENT DOCUMENTS

EP    3070380 A1    9/2016

OTHER PUBLICATIONS

International Search Report dated Nov. 6, 2019 in corresponding International Application No. PCT/US2019/046593(2 pages).

*Primary Examiner* — Huyen D Le
(74) *Attorney, Agent, or Firm* — Tyler A. Stevenson; Anna-lisa L. Gallo

(57) ABSTRACT

An automatic angle stop assembly for a urinal or toilet may include an angle stop adjustment device and an angle stop. The automatic angle stop assembly may automatically control flow through the angle stop to a flush valve. The automatic angle stop assembly may include a motor and an adjustment screw. A method for closing the angle stop may include sensing a flow condition, automatically rotating a motor based on the flow condition, and closing the angle stop.

20 Claims, 4 Drawing Sheets

(58) Field of Classification Search
USPC .............................................................. 4/300
See application file for complete search history.

(56) References Cited

U.S. PATENT DOCUMENTS

| | | | |
|---|---|---|---|
| 6,119,716 A * | 9/2000 | Wright | F16K 29/00 137/243.6 |
| 2004/0164260 A1* | 8/2004 | Jost | F16K 31/046 251/129.04 |
| 2016/0208465 A1 | 7/2016 | Evans et al. | |
| 2016/0290525 A1* | 10/2016 | Hotta | B60H 1/00921 |
| 2017/0058633 A1* | 3/2017 | Elliott | E21B 34/02 |
| 2017/0370492 A1 | 12/2017 | Obrist et al. | |

* cited by examiner

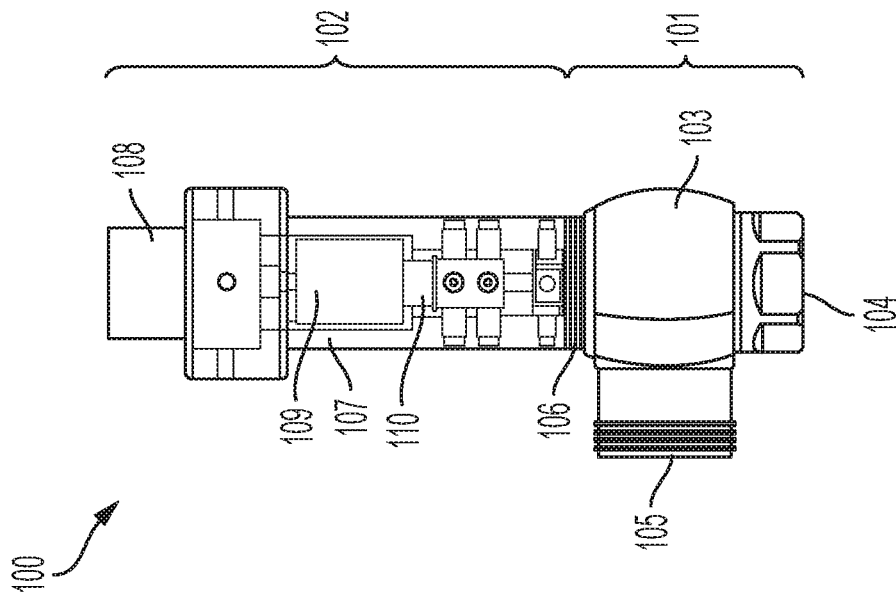
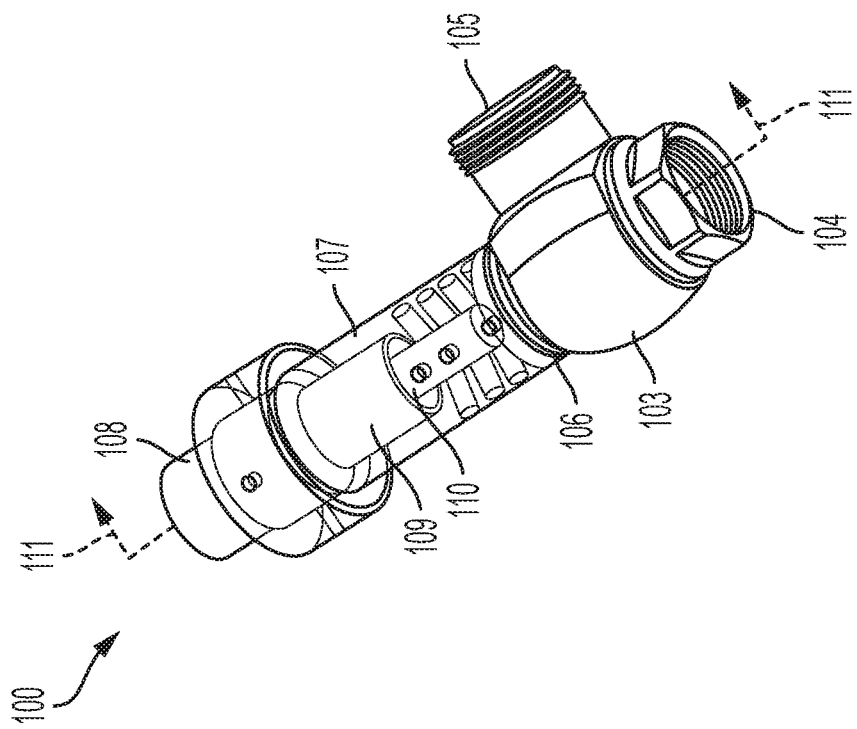
FIG. 1A
FIG. 1B

ANGLE STOP ASSEMBLY

The present invention relates to an angle stop assembly for a flush valve. In an embodiment, the invention relates to systems and methods directed to a motorized angle stop for automatically stopping flow to a flush valve.

BACKGROUND

Flushometer valves (flush valves, diaphragm flush valves) include angle stops for selectively controlling the flow of water from a main water supply to the flush valve and subsequently to a toilet or urinal. The angle stop is typically provided in-line between the main water supply and the flush valve. The angle stop may be selectively closed by a user to stop the flow of water, such as, for example, when maintenance or repair of the flush valve is required. With the angle stop closed, no water is permitted to flow to the flush valve and maintenance or repair of the flush valve may be performed. The angle stop may also be used to control an amount of water supplied to the flush valve and thus the amount of water or rate of flow of the water produced during a flush. For example, the angle stop may be partially-closed to reduce the amount of water provided to the flush valve and thus reduce the amount of water released during a flush cycle. Current technology for controlling the position (e.g. open, closed, partially-open, partially-closed) of an angle stop involves manually adjusting the position of the angle stop. A user, such as a plumber, typically uses a wrench, screwdriver, or other tool to turn a nut or connection at the angle stop itself to control the position of the angle stop. Such manual operation of the angle stop is imprecise (a user typically estimates the position of the valve based on the amount of water released) and time consuming (a user must be at the location of the particular flush valve to be repaired or maintained). There is a need for an angle stop which may be automatically controlled to a specific position. There is a need for an angle stop which may be automatically closed based on a sensed condition. There is a need for an angle stop that may be selectively positioned (e.g. open, closed, partially-open, partially-closed) to obtain a desired flow rate or flush volume.

SUMMARY

Accordingly, disclosed is an automatic angle stop assembly for a toilet or urinal, the assembly comprising an angle stop body; an angle stop valve disposed within the body; and an angle stop adjustment device coupled to the body, wherein the angle stop adjustment device is configured to automatically adjust a position of the angle stop valve based on a condition of the angle stop.

Also disclosed is an angle stop adjustment device for a toilet or urinal, comprising an adjustment screw; a motor coupled to the adjustment screw and configured to rotate the adjustment screw; and a controller, wherein the controller is configured to actuate the motor in response to a condition to adjust a position of the adjustment screw, and the adjustment device is configured to couple to an angle stop body.

According to an embodiment, the angle stop adjustment device may include an adjustment screw and a motor, wherein the motor is configured to rotate to adjust a position of the adjustment screw. The position of the adjustment screw may determine the position of the angle stop valve.

According to an embodiment, the angle stop assembly may include a sensor and a controller, wherein the sensor is configured to detect the condition ("a sensed condition") of the angle stop and to communicate the condition to the controller. The controller may be configured to actuate the adjustment device. The controller may be configured to send a signal to a motor to rotate the motor to move an adjustment screw.

The controller (microcontroller) is in electrical communication with the flow sensor and the adjustment device. Electrical communication may be via a wired connection or may be via a wireless connection.

The adjustment device, a controller, and sensor may be in electrical communication with a power source. A power source may comprise a battery, in some embodiments a primary battery or a rechargeable battery. A battery may be conveniently positioned in an interior space of a housing. In other embodiments, the angle stop assembly may be powered by a home electrical circuit.

In some embodiments, a flow sensor may comprise a propeller and operate via the Hall Effect. In other embodiments, the flow sensor may comprise a wheel and operate via the Hall Effect. In further embodiments, the flow sensor may be an ultrasonic sensor having emitter(s)/receiver(s) to measure fluid flow. In other embodiments, the flow sensor may comprise a flow switch. The flow sensor is in electrical communication with the controller. The controller may be configured to determine boolean fluid flow status and/or a fluid flow rate from data communicated from the flow sensor. Flow sensors and controllers are commercially available.

According to an embodiment, the assembly may be configured to detect a flush valve abnormal state. An abnormal state, or "failure state", may include one or more conditions selected from a constant flow, a leak, constant flushing, a flush valve stuck open, a mechanical failure of a flush valve, a solenoid failure in a flush valve, and a line backup.

According to an embodiment, the angle stop adjustment device may be configured to automatically move the angle stop from an open position to a closed position, for instance upon detecting an abnormal state. In other embodiments, the angle stop adjustment device may be configured to move the angle stop valve to an intermediate position between a fully open position and a fully closed position.

According to an embodiment, the angle stop assembly may include a motor, a female coupling socket, a male coupling socket, and an adjustment screw, wherein rotation of the motor rotates the female coupling socket, male coupling socket, and adjustment screw, and wherein rotation of the motor moves the adjustment screw. In some embodiments, an adjustment screw may be configured to move in a direction corresponding to an axis of an angle stop inlet.

According to an embodiment, an angle stop adjustment device for a toilet or urinal may include an adjustment screw; a motor coupled to the adjustment screw and configured to rotate the adjustment screw; and a controller for controlling rotation of the motor, wherein the controller is configured to actuate the motor in response to a sensed condition to adjust a position of the adjustment screw.

In an embodiment, the angle stop adjustment device may include a connector having an interior threaded surface, wherein an exterior threaded surface of the adjustment screw is configured to engage the interior threaded surface of the connector. The adjustment screw may be configured to rotate and translate longitudinally with respect to the connector.

The angle stop adjustment device may include a housing, the housing configured to couple to an angle stop via a connector. In some embodiments, the adjustment device may be disposed within a housing, that is, partially or completely disposed within the housing.

The position of the adjustment screw may determine a position of an angle stop valve. The angle stop adjustment device may include a female coupling socket coupled to a motor shaft of the motor and a male coupling socket received within a receptacle of the female coupling socket, wherein rotation of the motor rotates the female coupling socket and the male coupling socket. The receptacle may have a shape that mates with a shape of an outer surface of the male coupling socket such that rotation of the female coupling socket rotates the male coupling socket. An end of the male coupling socket may be coupled to an end of the adjustment screw such that rotation of the male coupling socket rotates the adjustment screw.

According to an embodiment, a method for automatically controlling flow through an angle stop may include sensing with a sensor a flow condition of an angle stop; actuating a motor to rotate based on the flow condition; rotating an adjustment screw with the motor, the adjustment screw moving longitudinally with respect to a housing of the angle stop; and closing the angle stop. The method may include closing the angle stop including moving longitudinally the adjustment screw to a lowermost position near an upper surface of an angle stop valve. The method may comprise determining with a controller the flow condition based on a sensor reading for a predetermined period of time.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements. The accompanying drawings are included to provide a further understanding of the invention and are incorporated in and constitute a part of this specification.

FIG. 1a and FIG. 1b depict an automatic angle stop assembly, according to an embodiment.

DETAILED DESCRIPTION

Figure 2B:
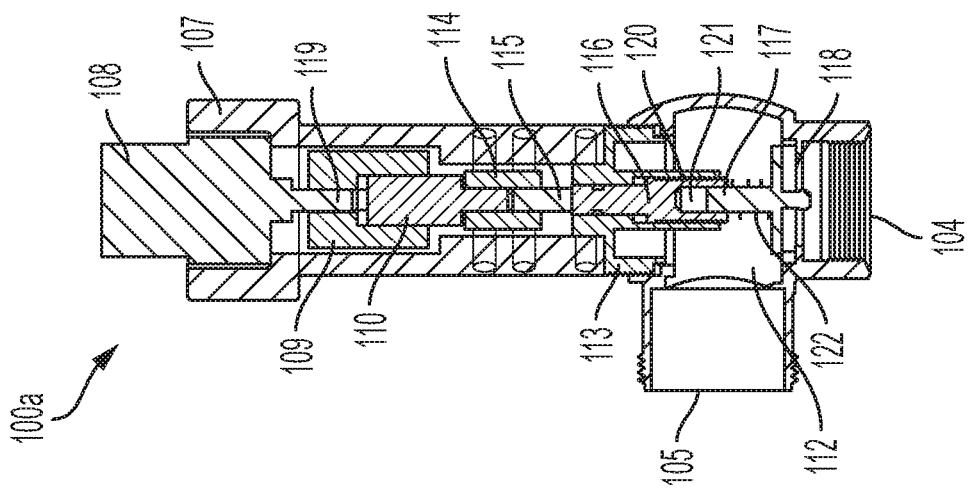
FIG. 2a and FIG. 2b show a cross-section view of an automatic angle stop assembly with an angle stop valve in an open position, according to an embodiment.

The present invention relates to an angle stop for a flush valve for sanitaryware, such as a toilet or urinal, and in some embodiments, an automatic angle stop assembly for sanitaryware. The automatic angle stop assembly may be located upstream of the flush valve. The angle stop of the automatic angle stop assembly may be used to adjust flow from the wall (e.g. flow from a main water supply) and/or control the flow of water to the flush valve. Automatic adjustment of the angle stop may prevent water damage and overflow. The automatic angle stop assembly may include an angle stop and an angle stop adjustment device.

FIG. 1a and FIG. 1b show an automatic angle stop assembly 100. Automatic angle stop assembly 100 includes an angle stop 101 and an angle stop adjustment device 102. Angle stop 101 includes a body 103, an inlet 104, and an outlet 105. Inlet 104 may be in flow communication with a main water source, such as a building or city water source. Inlet 104 may permit fluid, such as water, to flow from a main water source and enter into body 103. Outlet 105 may be in flow communication with an inlet of a flush valve. A flush valve may be a diaphragm flush valve. Outlet 105 may permit fluid, such as water, to flow out of body 103 and enter a flush valve (not depicted). Inlet 104 and outlet 105 may be threaded for coupling to a water supply line and flush valve, respectively. Other connection types for coupling inlet 104 and outlet 105 to a water supply line and flush valve, respectively, may be provided. Inlet 104 and outlet 105 may be arranged such that fluid "turns" within body 103 to flow from inlet 104 to outlet 105. Inlet 104 and outlet 105 may be arranged at about 90 degrees from each other, although other relationships may be provided. Angle stop 101 may include a connection feature 106 for coupling to angle stop adjustment device 102. Connection feature 106 may be located opposed from or about 180 degrees from inlet 104, although other relationships may be provided.

With continued reference to FIG. 1a and FIG. 1b, angle stop adjustment device 102 may have a housing 107. Housing 107 of FIG. 1a and FIG. 1b is provided in a "see-through" view. Housing 107 may be coupled to connection feature 106 by, for example, threads, adhesion, or welding, etc. Housing 107 may enclose the components of angle stop adjustment device 102. Angle stop adjustment device 102 may have a motor 108, female coupling socket 109, and male coupling socket 110. Motor 108 may extend from a distal end of angle stop adjustment device 102. Alternatively, motor 108 may be located wholly within housing 107. Motor 108 may be a gear reduction motor.

Although not depicted, automatic angle stop assembly 100 may include a sensor and a controller. A sensor may be a flow sensor for detecting flow through angle stop 101 and/or a flush valve. A sensor may detect flow after a predetermined time period. A controller may send signals to motor 108 to rotate the motor clockwise and/or counter-clockwise for a predetermined period of time. A predetermined period of time may correspond to opening, closing, partially-opening, or partially-closing the angle stop 101. That is, a predetermined period of time may correspond to the period of time needed for an adjustment screw to translate upward or downward within angle stop 101.

FIG. 2a, FIG. 2b, FIG. 3a, and FIG. 3b show a cross-section 100a of automatic angle stop assembly 100 along central axis 111. Angle stop 101 contains an angle stop valve 112. Assembly 100 comprises a connector 113 for coupling housing 107 to connection feature 106. Although depicted as threads, connector 113 may couple to connection feature 106 via other means, for example, welding, brazing, or adhering. Angle stop adjustment device 102 comprises motor 108, female coupling socket 109, male coupling socket 110, first coupling 114, second coupling 115, and adjustment screw 116. Adjustment screw 116 is coupled to valve stem 117. Valve stem 117 is coupled to a plate having a seal 118. Seal 118 may be associated with a plate. A seal and plate may be substantially cylindrical to conform or correspond to a shape of inlet 104. Although depicted and described as cylindrical, a seal may be other shapes so long as the shape conforms to an inlet and permits the sealing of an inlet.

Motor 108 may be received within an enlarged portion housing 107. Motor 108 may be static with respect to housing 107. Motor 108 may be located on an internal shoulder of housing 107. Motor 108 comprises a motor shaft 119. Motor shaft 119 may be configured to rotate with motor 108. Motor shaft 119 may be coupled to a female coupling socket 109. Female coupling socket 109 may have an opening in which motor shaft 119 is located. Motor shaft 119 may be fixedly located within an opening such that relative motion between motor shaft 119 and female coupling socket 109 is not permitted or does not occur. Motor shaft 119 may be fixedly connected to an opening via welding, brazing, adhesion, fasteners, etc. Accordingly, when motor 108 rotates, motor shaft 119 and female coupling socket 109 rotate with the motor 108.

Female coupling socket 109 may include a receptacle for receiving a portion of male coupling socket 110. Male coupling socket 110 may have a shape that corresponds to, mates with, or conforms with a shape of a female coupling socket receptacle. For example, a receptacle may have a hexagonal shape, that is, in cross-section, a receptacle may be shaped like a hexagon. Male coupling socket 110 may have an outer surface that in cross-section is shaped like a hexagon. Male coupling socket 110 is thus received into a receptacle of the female coupling socket 109. A mating connection between female coupling socket 109 and male coupling socket 110 may allow for male coupling socket 110 and female coupling socket 109 to rotate together. That is, when motor 108 rotates motor shaft 119 and thus female coupling socket 109, male coupling socket 110 rotates. Male coupling socket 110 may be capable of longitudinal movement with respect to the female coupling socket 109. As will be further described below, to change a position of angle stop valve 112, male coupling socket 110 may be allowed to move longitudinally upward and downward with respect to female coupling socket 109. Thus, male coupling socket 110 may not rotate relative to the female coupling socket 109, but may move longitudinally relative to female coupling socket 109. Male coupling socket 110 may be a male shaft adapter or a male hex adapter. Female coupling socket 109 may be a female hex coupling.

Male coupling socket 110 may be coupled to first coupling 114 and second coupling 115. First coupling 114 may be a tubular coupling. Second coupling 115 may be a shaft, rod, or rod-like coupling. First coupling 114 may be located around an end of the male coupling socket 110. First coupling 114 may be located around an end of second coupling 115. Male coupling socket 110, first coupling 114, and second coupling 115 may be fixedly or permanently secured together. For example, male coupling socket 110 and first coupling 114 may be welded, brazed, adhered, or fastened together. A first coupling and second coupling 115 may be welded, brazed, adhered, or fastened together. In an embodiment, first coupling 114 may include one or more first fasteners for securing first coupling 114 to male coupling socket 110 and one or more second fasteners for securing first coupling 114 to second coupling 115. In this manner, no relative movement (e.g. rotational or longitudinal) is permitted between the components. That is, when one of the components rotates and/or moves longitudinally, male coupling socket 110, first coupling 114, and second coupling 115 all rotate and/or move longitudinally. Alternatively, male coupling socket 110, first coupling 114, and second coupling 115 may be integrally or unitarily formed or molded such that they components are formed as a single piece.

Second coupling 115 may be coupled to adjustment screw 116. Second coupling 115 may be fixedly secured to adjustment screw 116, such as with welding, brazing, adhering, or fastening, etc. Thus, adjustment screw 116 may move, rotate, and/or translate with male coupling socket 110, first coupling 114, and second coupling 115. Adjustment screw 116 may have a threaded portion 120. Threaded portion 120 may be an exterior threaded surface. Threaded portion 120 may cooperate with a threaded portion on connector 113. A threaded portion on a connector 113 may be a bore having an internal threaded surface. Threaded portion 120 may be a shaft having an exterior threaded surface. Adjustment screw 116 may thus rotate and/or move longitudinally with respect to the connector 113 as the threaded portion 120 translates along a threaded portion of connector 113. In an embodiment, an adjustment screw may be replaced with a needle valve. In an embodiment, first coupling 114, second coupling 115, and adjustment screw 116 may be omitted. In this embodiment, a shaft of male coupling socket 110 may be provided with a threaded outer surface for engaging with an inner threaded surface of connector 113. Alternatively, first coupling 114 and second coupling 115 may be omitted and male coupling socket 110 and adjustment screw 116 may be formed as a single, integral component.

Adjustment screw 116 may include a bore 121 for receiving valve stem 117. Adjustment screw 116 may move relative to valve stem 117. That is, adjustment screw 116 may rotate and/or move longitudinally with respect to valve stem 117. A biasing member 122 may be located between a lower surface of adjustment screw 116 and an upper surface of seal 118. A biasing member may be a spring, such as a coil spring, although other biasing members are contemplated. A biasing member may operate to bias angle stop valve 112 to a closed position.

Figure 2A:
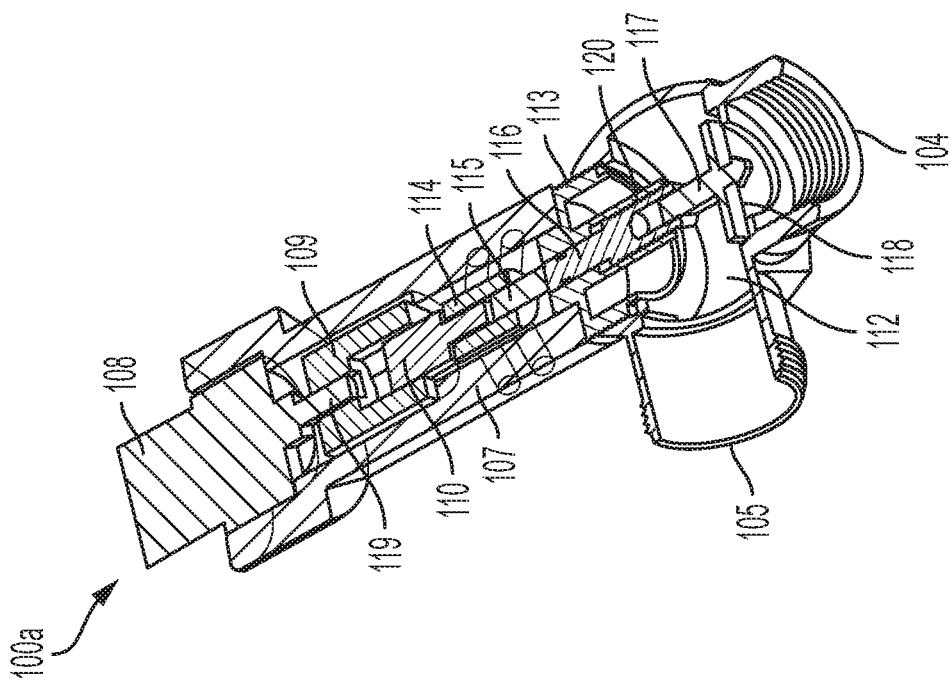

FIG. 2*a* and FIG. 2*b* show angle stop 101 in an open position. An open position of angle stop 101 may allow for fluid to flow into inlet 104 and exit outlet 105. That is, when angle stop 101 is in an open position, fluid, such as water, is permitted to flow from a main water source (e.g. building, house, or municipal water supply) through a main water supply line, into inlet 104 of angle stop 101, through outlet 105, and into the flush valve (not depicted) for flushing a toilet or urinal. Although the system is described for a toilet or urinal, other sanitaryware may be contemplated. Water flowing through inlet 104 may apply pressure on seal 118. This pressure may act against the force of a biasing member permitting seal 118 to move longitudinally upward into body 103 of angle stop 101. This may allow fluid to move through inlet 104, through body 103, and exit outlet 105 to a flush valve. For example, upward movement of seal 118 may compress a biasing member between seal 118 and adjustment screw 116. During normal operation, angle stop valve 112 may be normally biased to an open position due to the presence of fluid within angle stop 101. That is, before, during, and after a flush cycle of the flush valve, fluid may be present in body 103 of angle stop 101. Shown in FIG. 2*a* and FIG. 2*b* are views of angle stop 101 in an open position with no fluid present in body 103. That is, adjustment screw 116 is an upper position such that when fluid is admitted to inlet 104, angle stop valve 112 may be opened against the force of a biasing member. When angle stop 101 is in an open position, angle stop valve 112 may be permitted to open and close. When angle stop 101 is in a closed position (FIG. 3a and FIG. 3b), angle stop valve 112 is prohibited from opening due to adjustment screw 116.

Figure 3B:
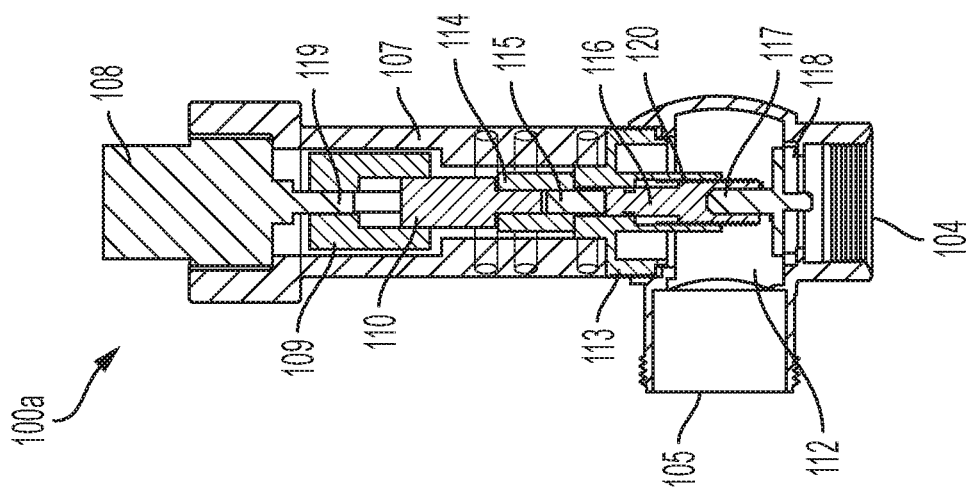
FIG. 3a and FIG. 3b show a cross-section view of an automatic angle stop assembly with angle stop valve in a closed position, according to an embodiment.
Figure 3A:
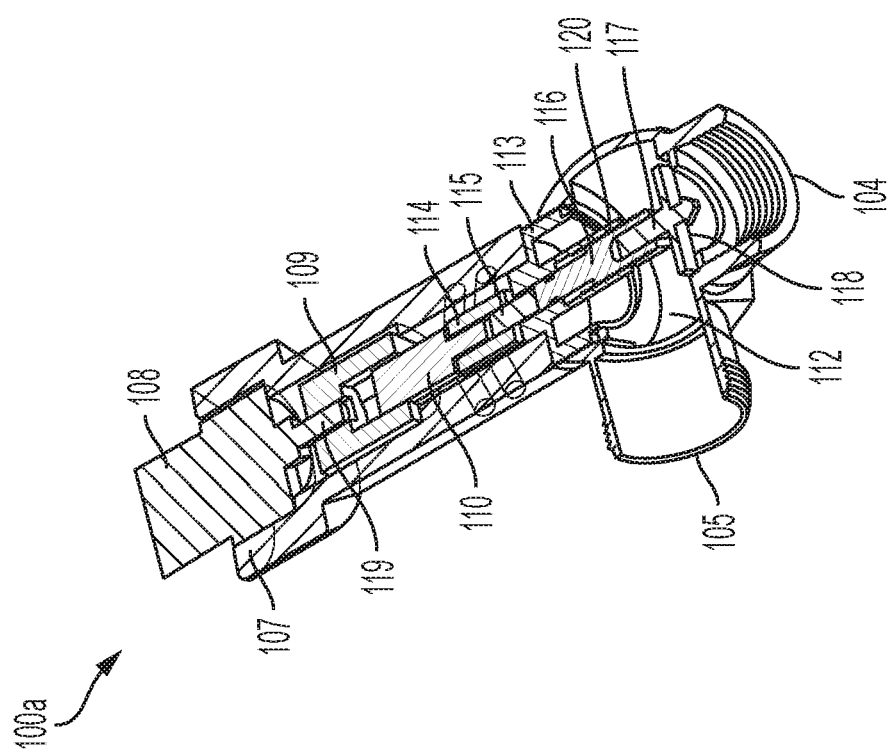

FIG. 3a and FIG. 3b show angle stop 101 in a closed position. A closed position of angle stop 101 may prevent or prohibit fluid to flow into inlet 104. That is, when angle stop 101 is in a closed position, fluid, such as water, is not permitted to flow from a main water source through a main water supply line and into inlet 104 of angle stop 101. In a closed position, adjustment screw 116 may be located at a lowermost position such that a lower surface adjustment screw 116 is in close proximity and/or is adjacent to an upper surface of seal 118. In some embodiments, adjustment screw 116 may compress a biasing member such that extension of a biasing member is not possible. In this position, fluid pressure acting on seal 118 from a main water supply line cannot move angle stop valve 112 to an open position. In a closed position, all fluid to the flush valve (not depicted) is shut off. This may allow for maintenance, repair, replacement, etc. of the flush valve.

Further to fully open and fully closed positions of angle stop 101 as depicted in FIG. 2a, FIG. 2b, FIG. 3a, and FIG. 3b, intermediate positions may also be provided. For example, adjustment screw 116 may be moved to a position between the position of FIG. 2a and FIG. 3a such that the angle stop valve 112 is still permitted to open, but is not permitted to be as open as in FIG. 2a (fully open). This may allow for a flow rate and/or flush volume to be controlled.

Angle stop adjustment device 102 may move angle stop 101 from an open position of FIG. 2a and FIG. 2b to a closed positon of FIG. 3a and FIG. 3b. Motor 108 is actuated to rotate clockwise. As motor 108 rotates, female coupling socket 109, male coupling socket 110, first coupling 114, second coupling 115, and adjustment screw 116 rotate. As the components rotate, threaded portion 120 of adjustment screw 116 rotates clockwise within a threaded portion of connector 113. Coupling of threaded portion 120 and a threaded portion of connector 113 allows for threaded portion 120 to advance longitudinally downward as adjustment screw 116 rotates. That is, as threaded portion 120 rotates, threaded portion 120 moves longitudinally downward with respect to connector 113. Longitudinal movement of threaded portion 120 moves adjustment screw 116 longitudinally downward. Adjustment screw 116 moves longitudinally toward seal 118 of angle stop valve 112. Adjustment screw 116 moves to a lowermost position that prevents seal 118 from moving upward to open, thus moving angle stop 101 to a fully closed position to prevent fluid flow through angle stop 101 to a flush valve. Motor 108 may be stopped when angle stop 101 is in a fully closed position. Alternatively, motor 108 may be stopped before adjustment screw 116 reaches a lowermost position thus moving angle stop 101 to an intermediate position between a fully open and a fully closed position. An intermediate position may be a partially-open and/or partially-closed position. An intermediate position may reduce the volume and/or flow rate of the water used for a flush cycle as compared to the fully open position.

Angle stop adjustment device 102 may move angle stop 101 from a closed position of FIG. 3a and FIG. 3b to an open position of FIG. 2a and FIG. 2b or to an intermediate position between the closed and open positions. Motor 108 is actuated to rotate counterclockwise. As motor 108 rotates, female coupling socket 109, male coupling socket 110, first coupling 114, second coupling 115, and adjustment screw 116 rotate. As the components rotate, threaded portion 120 of adjustment screw 116 rotates counterclockwise within a threaded portion connector 113. The coupling of threaded portion 120 and threaded portion of connector 113 allows for threaded portion 120 to advance longitudinally upward as threaded portion 120 rotates. That is, as threaded portion 120 rotates, threaded portion 120 moves longitudinally upward with respect to connector 113. Longitudinal movement of threaded portion 120 moves adjustment screw 116 longitudinally upward. Adjustment screw 116 moves longitudinally away from seal 118 of angle stop valve 112. Adjustment screw 116 moves to an uppermost position that allows seal 118 to move upward against the force of a biasing member to open, thus moving angle stop 101 to a fully open position of FIG. 2a and FIG. 2b allowing fluid flow through angle stop 101 to a flush valve. Motor 108 may be stopped when angle stop 101 is in a fully open position. Alternatively, motor 108 may be stopped before adjustment screw 116 reaches an uppermost position thus moving angle stop 101 to an intermediate position.

Figure 4A:
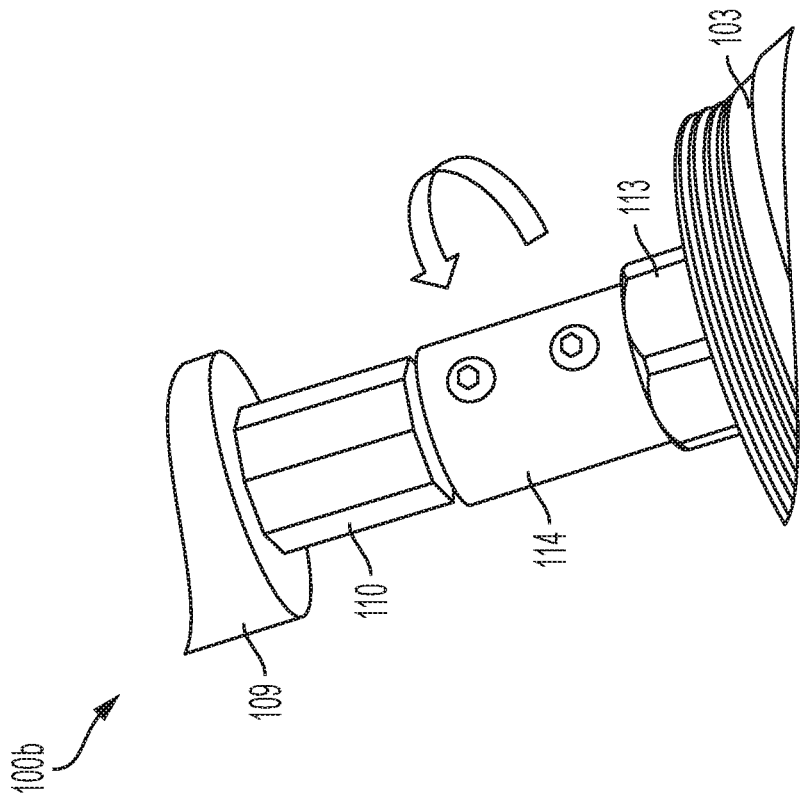
FIG. 4a and FIG. 4b show a partial view of a coupling of an automatic angle stop assembly without a housing and in an open position and a closed position, respectively, according to an embodiment.
Figure 4B:
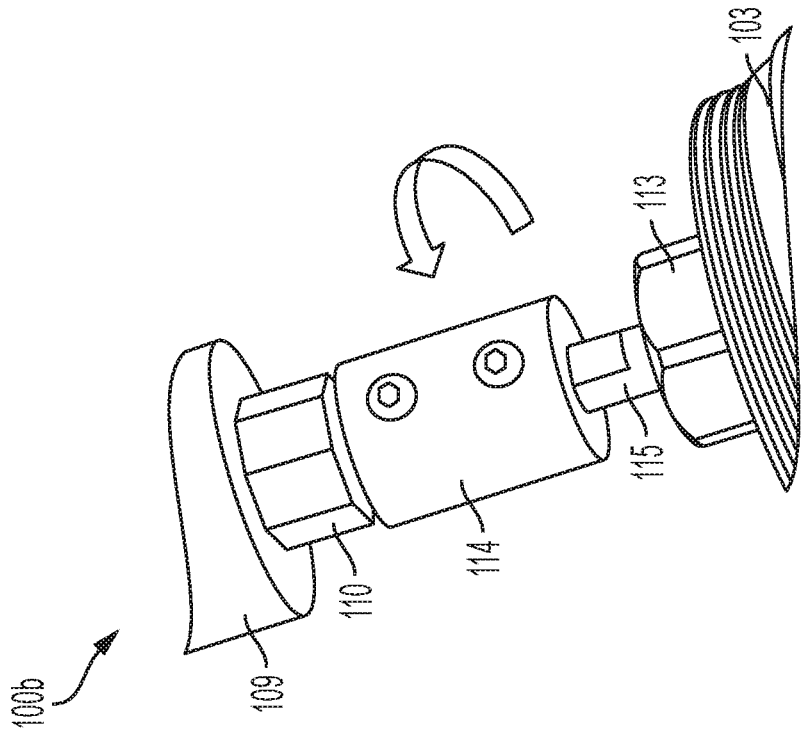

FIG. 4a and FIG. 4b show a portion 100b of angle stop adjustment device 102 in an open and a closed position, respectively, with housing 107 not present. As motor 108 turns in a clockwise position, male coupling socket 110, first coupling 114, and second coupling 115 may move from the position of FIG. 4a to the position of FIG. 4b. As adjustment screw 116 (not visible) rotates in a clockwise direction, as previously described, adjustment screw 116 moves longitudinally downward from the position in FIG. 4a (open) to the position in FIG. 4b (closed). Due to the coupling of the components, second coupling 115, first coupling 114, and male coupling socket 110 move longitudinally downward as well. As illustrated in FIG. 3b, the components are displaced from female coupling socket 109. When adjustment screw 116 rotates in a counterclockwise direction (not shown) and moves longitudinally upward, second coupling 115, first coupling 114, and male coupling socket 110 move longitudinally upward as well. That is, male coupling socket 110, first coupling 114, and second coupling 115 may move longitudinally upward from the position of FIG. 4b (closed) to the position of FIG. 4a (open). Thus, as shown in FIG. 4a and FIG. 4b, second coupling 115 may extend out a distal end of connector 113 when angle stop 101 is in an open position. Second coupling 115 may be located within connector 113 when angle stop 101 is in a closed position.

In operation, a sensor, such as a flow sensor, may sense a condition in the toilet or urinal. A controller electrically coupled to the sensor may detect the sensor value and determine a condition of the toilet or urinal. For example, the flow sensor may sense a constant flow through an angle stop indicating to a controller that there is a constant flow or constant flushing of a flush valve. The controller may send a signal to a motor to rotate clockwise until the angle stop is closed. In an embodiment, clockwise/counterclockwise rotation corresponding to closing/opening may be reversed, depending on a configuration of threaded elements. A controller may actuate a motor until an adjustment screw is translated longitudinally downward to a lowermost position. A controller may determine the position of an adjustment screw and then signal a motor to stop rotating when an adjustment screw is in a lowermost position. Alternatively, a controller may rotate a motor 108 for a predetermined period of time corresponding to a time needed for an adjustment screw to translate to a lowermost position. With an angle stop closed, maintenance or repairs may performed on a flush valve or other downstream components. When an angle stop is to be opened again, a sensor may sense a normal flow condition and a microcontroller may send a signal to a motor to rotate counterclockwise to open the valve. Thus, the assembly may be configured to be automatic and may be autonomously operated. Alternatively, a technician may send a command to the controller to open the angle stop. In some embodiments, a controller may send a signal to a main computer, technician's mobile device, etc. that an angle stop has been closed and flush valve maintenance is needed.

In some embodiments, a sensor may sense a flow rate and/or a controller may calculate a flow rate through the angle stop and/or a flush valve. A controller may be set for a target flow rate and adjust a position of an adjustment screw to correspond to a desired target flow rate. As discussed previously, a longitudinal position of the adjustment screw may determine a distance an angle stop valve is allowed to open and thus may determine a volume and/or flow rate of a flush cycle in a flush valve. For example, a target flow rate may be 25 gallons per minute (gpm). A controller may be set to adjust the position of the adjustment screw to maintain a flow rate through the angle stop to about 25 gpm.

In an embodiment, water may enter an angle stop from an inlet pipe. The inlet pipe may be an inlet pipe behind a wall, such as an inlet pipe from a main water supply as previously described. An internal flow sensor in the angle stop may detect or monitor water flow. An internal flow sensor may monitor flow of water from the inlet pipe behind the wall and through the angle stop. An internal flow sensor may detect water flow through the angle stop and compare it to a predetermined threshold, such as 10 seconds. If an internal flow sensor detects water flow for less than the predetermined threshold (e.g. less than 10 seconds), the system is configured to continue normal flush valve operation. If an internal flow sensor detects water flor for greater than a predetermined threshold (e.g. greater than 10 seconds), a controller may be configured to send a signal to a relay to activate a motor to shut off water flow to the flush valve. A motor may operate to shut off water flow to a flush valve by closing the angle stop in the previously described manner.

Thus, the present disclosure describes an angle stop that may be automatically controlled. The angle stop may be automatically shut off or closed if there is a problem with the flush valve, such as constant flow or constant flushing. An angle stop may be automatically closed or open based on a condition sensed by a sensor and communicated to a controller. A controller may actuate a motor to rotate clockwise and/or counterclockwise to automatically move the angle stop to a desired position based on the sensed condition. A sensed condition may be, for example, an abnormal state such as constant flushing, constant flow, or other leak condition. A sensed condition may be wherein a flush valve is stuck open or other mechanical failure or abnormal state of a flush valve. A sensed condition may be a line backup, such as from a waste line. A sensed condition may be wherein a flush valve is operating normally and/or that a predetermined maintenance of the flush valve is scheduled.

The present disclosure describes an automatic angle stop assembly that may be a safety device. The automatic angle stop assembly may be networked with a building management system and/or other internet of things (IOT) devices, that is, devices embedded with electronics, software, sensors, actuators, and connectivity that enables the devices to connect and exchange data with the automatic angle stop assembly. Thus, the automatic angle stop assembly may communicate with these devices sending and receiving signals with respect to operation of the angle stops.

In some embodiments, an automatic angle stop assembly of the present disclosure may be associated with a urinal or a toilet. The coupling between an automatic angle stop assembly and a flush valve on a urinal may be a ¾ inch thread. The coupling between an automatic angle stop assembly and a flush valve on a toilet may be a 1" thread. Additionally, the automatic angle stop assembly may be configured to couple to flush valves in a commercial setting, such as, for example, public restrooms in office buildings, airports, schools, and other public locations. The automatic angle stop assembly of the present disclosure may be retrofitted onto existing toilets or urinals. For example, the angle stop of an existing toilet or urinal may be removed and replaced with the automatic angle stop assembly of the present disclosure.

Flush valves may be connected to an angle stop for controlling flow of water to the flush valve. An angle stop may allow for control of the flow of water for maintenance purpose or controlling the amount of water flow to a urinal or toilet. An automatic angle stop assembly of the present disclosure may incorporate a sensor that may detect constant water flow for a period of time. In the event of a catastrophic failure (e.g. constant flushing where water constantly flows to the urinal or toilet), water flowing constantly may eventually exceed the flush capacity. Constant flow may be due to either failure of a solenoid or mechanical obstructions preventing the flush valve from stopping the flush or water flow to a toilet or urinal. After a fixed amount of time specified in software (e.g. controller) that may indicate constant flushing, a controller may then send a signal to the motor attached to the angle stop and close the mechanism inside the angle stop to stop the water flow to the flush valve thus eliminating this failure. The automatic angle stop assembly may be retrofit-able to flush valve systems that incorporate an angle stop with a urinal or toilet. The automatic angle stop assembly of the present disclosure may allow for water flow to an individual flush valve to be turned off instead of a main valve to an entire floor or building.

In some embodiments, the automatic angle stop assembly may comprise an electronic bypass actuator configured to open, close, or adjust the angle stop. In some embodiments, such an electronic actuator may be positioned on an exterior of a housing, operable by a plumber. An electronic actuator may be a toggle switch, a button, a lever, a knob, etc. in electrical communication with a motor.

In some embodiments, the angle stop assembly may comprise a manual bypass actuator configured to open, close, or adjust the angle stop valve in the event of an electrical or electronics failure. Electrical or electronics failures include a power outage, drained battery, broken controller, etc. A manual bypass actuator may comprise a nut, a screw, and the like. Thus, in some embodiments, the automatic angle stop assembly may be configured to be manually opened/closed as desired.

Features described in connection with one embodiment of the invention may be used in conjunction with other embodiments, even if not explicitly stated above.

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through. The terms "upstream" and "downstream" indicate a direction of gas or fluid flow, that is, gas or fluid will flow from upstream to downstream.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

All U.S. patent applications, published patent applications and patents referred to herein are hereby incorporated by reference.

The invention claimed is:

1. An automatic angle stop assembly comprising
an angle stop body;
an angle stop valve disposed within the body; and
an angle stop adjustment device coupled to the body, wherein
the angle stop valve is configured to be in flow communication with an inlet of a flush valve for a toilet or a urinal,
the angle stop adjustment device is configured to automatically adjust a position of the angle stop valve based on a fluid flow rate through the angle stop valve during a flush cycle, and
the angle stop adjustment device is configured to automatically adjust the angle stop valve to an intermediate position between a fully open position and a closed position.

2. The angle stop assembly of claim 1, wherein
the angle stop adjustment device comprises an adjustment screw and a motor,
the motor is configured to rotate to adjust a position of the adjustment screw, and
the position of the adjustment screw determines the intermediate position of the angle stop valve.

3. The angle stop assembly of claim 1, comprising a sensor and a controller, wherein
the sensor is configured to detect the fluid flow rate through the angle stop valve,
the sensor is configured to communicate the fluid flow rate to the controller, and
the controller is configured to actuate the angle stop adjustment device.

4. The angle stop assembly of claim 3, wherein the sensor is a flow sensor.

5. The angle stop assembly of claim 3, wherein the controller is configured to actuate a motor to rotate the motor to move an adjustment screw.

6. The angle stop assembly of claim 3, wherein the controller is in electrical communication with the sensor via a wired or a wireless connection.

7. The angle stop assembly of claim 3, wherein the controller is in electrical communication with the adjustment device via a wired or a wireless connection.

8. The angle stop assembly of claim 1, wherein the adjustment device is disposed within a housing.

9. The angle stop assembly of claim 8, wherein the housing is coupled to the angle stop body via a connector.

10. The angle stop assembly of claim 9, wherein the connector comprises an interior threaded surface, and wherein an exterior threaded surface of the adjustment screw is configured to engage the interior threaded surface of the connector.

11. The angle stop assembly of claim 10, wherein the adjustment screw is configured to rotate and translate longitudinally with respect to the connector.

12. The angle stop assembly of claim 1, comprising a motor, a female coupling socket, a male coupling socket, and an adjustment screw, wherein rotation of the motor rotates the female coupling socket, male coupling socket, and adjustment screw, and rotation of the motor moves the adjustment screw.

13. The angle stop assembly of claim 12, wherein the female coupling socket is coupled to a motor shaft of the motor and the male coupling socket is received within a receptacle of the female coupling socket, and wherein rotation of the motor rotates the female coupling socket and the male coupling socket.

14. The angle stop assembly of claim 1, wherein the angle stop valve intermediate position is configured to provide for a target flush volume during the flush cycle.

15. The angle stop assembly of claim 1, wherein the angle stop adjustment device is configured to automatically adjust the position of the angle stop valve to the closed position.

16. The angle stop assembly of claim 1, wherein the angle stop adjustment device is configured to automatically adjust the position of the angle stop valve to the fully open position.

17. The angle stop assembly of claim 1, comprising an electronic or manual bypass actuator configured to open, close, or adjust the angle stop.

18. An angle stop adjustment device for an angle stop valve, comprising
an adjustment screw;
a motor coupled to the adjustment screw and configured to rotate the adjustment screw;
a sensor;
and
a controller,
wherein
the angle stop valve is configured to be in flow communication with an inlet of a flush valve for a toilet or a urinal,
the controller is configured to actuate the motor in response to a sensed fluid flow rate through the angle stop valve to adjust a position of the adjustment screw to an intermediate position between a fully open position and a closed position, and
the adjustment device is configured to couple to an angle stop body.

19. The angle stop adjustment device of claim 18, wherein the device comprises a flow sensor.

20. The angle stop adjustment device of claim 18, comprising a female coupling socket, and a male coupling socket, and wherein actuation of the motor rotates the female coupling socket, the male coupling socket, and adjustment screw.

\* \* \* \* \*